Figure 1:
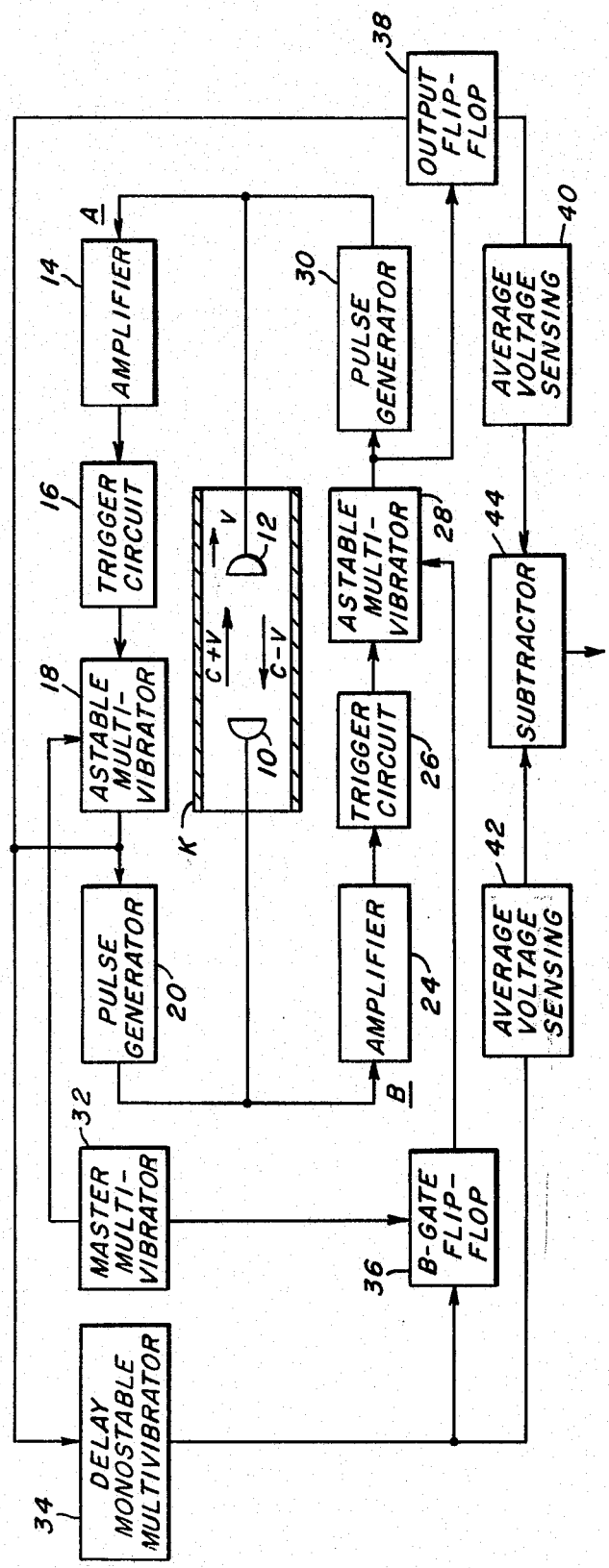

United States Patent [19]

McShane

[11] 3,882,722

[45] May 13, 1975

[54] MULTIPLE TIME DIFFERENCE ULTRASONIC FLOWMETERS

[75] Inventor: James L. McShane, Pittsburgh, Pa.

[73] Assignee: Westinghouse Electric Corporation, Pittsburgh, Pa.

[22] Filed: Sept. 7, 1973

[21] Appl. No.: 395,318

[52] U.S. Cl. .............................................. 73/194 A
[51] Int. Cl. ............................................. G01f 1/00
[58] Field of Search ................................ 73/194 A

[56] References Cited
UNITED STATES PATENTS

| | | | |
|---|---|---|---|
| 3,653,259 | 4/1972 | McShane | 73/194 A |
| 3,678,731 | 7/1972 | Wells et al. | 73/194 A |

Primary Examiner—Charles A. Ruehl
Attorney, Agent, or Firm—C. M. Lorin

[57] ABSTRACT

An improvement in systems for measuring the rate of fluid flow wherein the time delay between acoustic pulses transmitted upstream and downstream in a fluid passing along a path of travel is multiplied by repeated transmissions over predetermined time intervals. Successive time intervals over which the transmissions occur vary in duration to compensate for the last-pulse effect wherein the last pulse in the output waveform representing the last two transmitted pulses in the fluid stream is not completely encompassed within a fixed measurement time interval.

3 Claims, 6 Drawing Figures

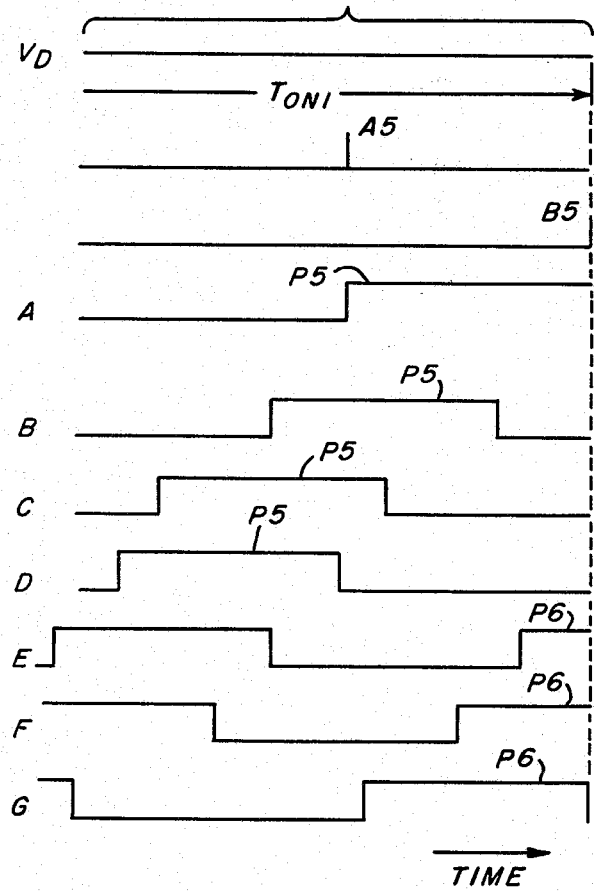
FIG. 3A.
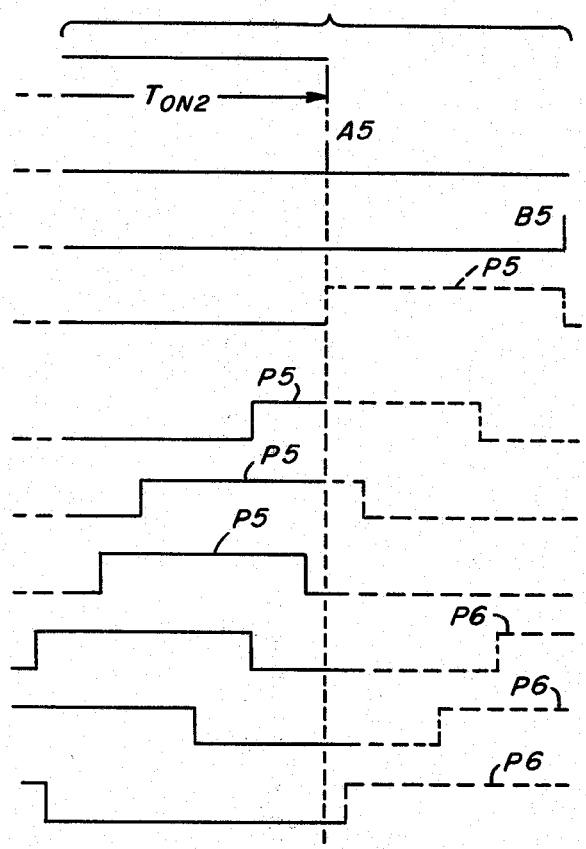
FIG. 3B.
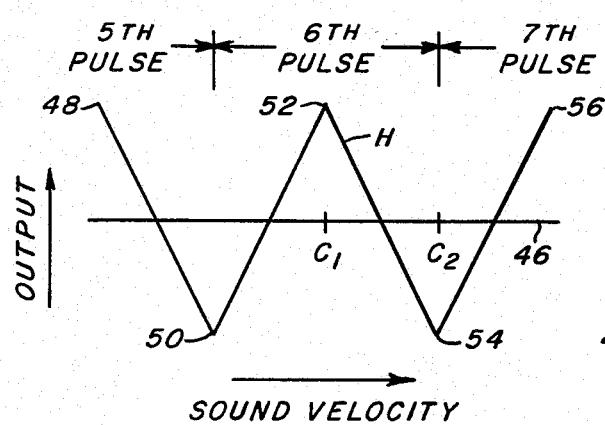
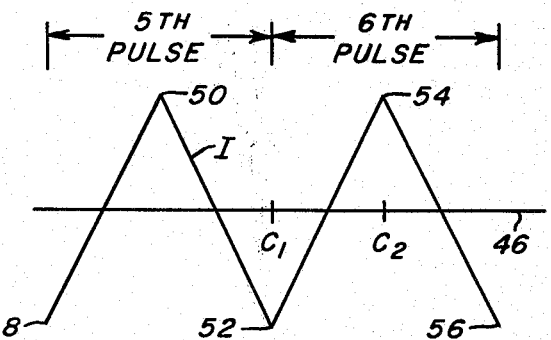

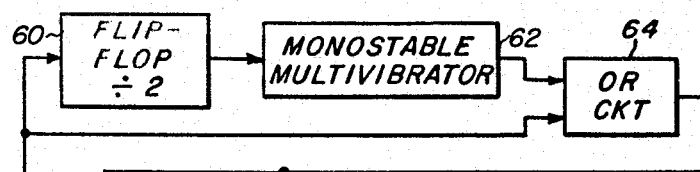
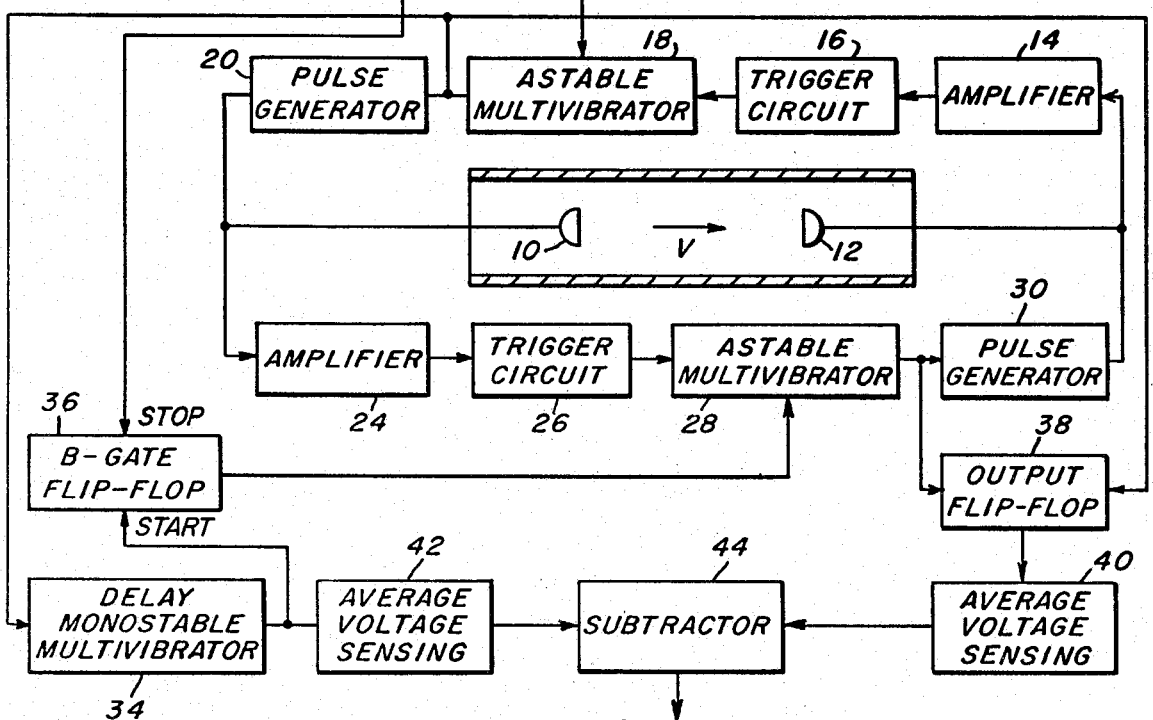
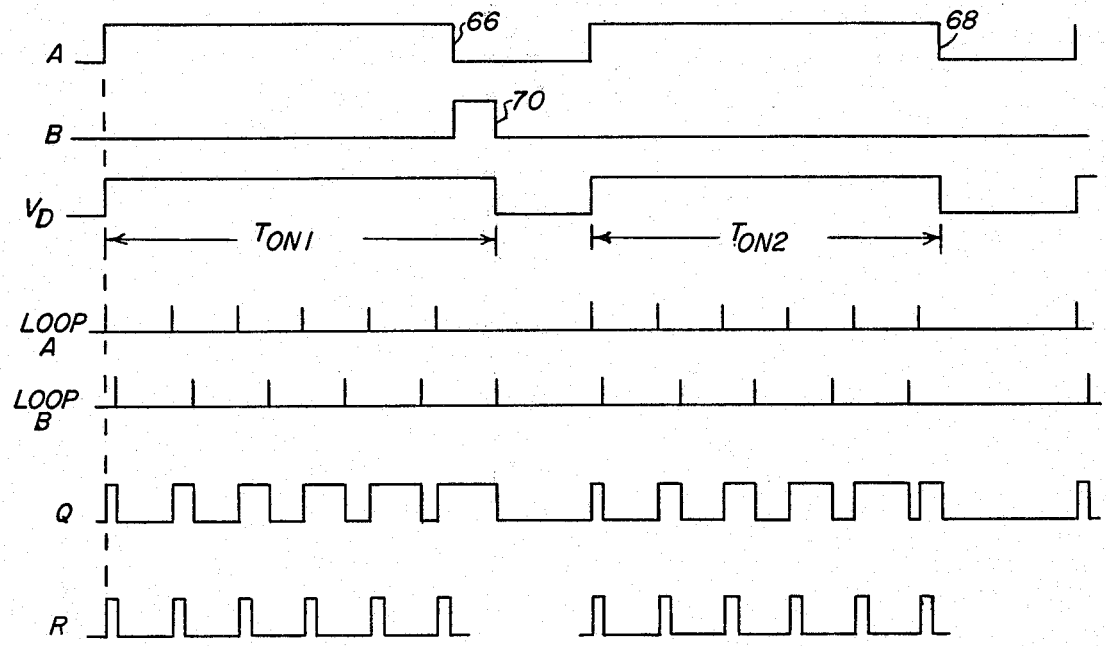

MULTIPLE TIME DIFFERENCE ULTRASONIC FLOWMETERS

BACKGROUND OF THE INVENTION

The usual principle of ultrasonic flowmeters involves the transmission of ultrasonic waves through a fluid medium in two directions, one upstream and the other downstream of the direction of flow, and comparing the transit times, normally over paths of equal lengths. Assuming that the speed of sound remains constant, the speed of propagation of the waves in the fluid medium is the same over both paths with no fluid flow; and the transit time varies according to the velocity of the fluid medium which shortens the transit time over the downstream path and lengthens the transit time over the upstream path. From the difference between the upstream and downstream transit times, the flow velocity of the liquid medium can be calculated by a time difference technique.

The basic theory of the time difference technique can be explained as follows: Assume, for example, that a conduit having a uniform flow of fluid of velocity, $v$, contains two sets of transducers facing each other at a spacing, $d$, between the two. If the sound velocity in the fluid at rest is $c$, then the respective transit times downstream $t_A$, and upstream, $t_B$ can be represented as follows:

$$t_A = \frac{d}{(c+v)}$$

and $$t_B = \frac{d}{(c-v)}.$$

If a pulse is simultaneously transmitted in both paths, the received signals arrive at times differing by:

$$\Delta t = t_B - t_A = \frac{2\,dv}{c^2 - v^2}$$

The velocity of the fluid $v$, is almost always much smaller than the sound velocity, $c$, in the fluid at rest for all practical applications in liquids. For these applications, the approximate equation:

$$\Delta t = \frac{2\,dv}{c^2}$$

is sufficiently accurate. Thus, $\Delta t$ is proportional to $v$ with the calibration constant being a function of $c$, and $v$ can be determined from the relationship:

$$v = (\tfrac{1}{2}d)c^2 \Delta t$$

where $\tfrac{1}{2}d$ is a constant.

In U.S. Pat. No. 3,653,259, issued Apr. 4, 1972, an ultrasonic flowmeter system based upon a time difference technique is described wherein the time delay between acoustic pulses transmitted upstream and downstream in a fluid passing along a path of travel is multiplied by repeated transmissions in sing-around fashion. This has the advantage of obviating the necessity for measuring very small differences between upstream and downstream transmissions to determined velocity, because of the cumulative effect of combining the time delays between upstream and downstream pulses over a period of time.

One limitation of the system shown in U.S. Pat. No. 3,653,259 is that, while wide range sound velocity changes are compensated for, the output for constant fluid velocity fluctuates about a mean value as sound velocity changes. Such sound velocity changes may occur, for example, due to temperature changes in the fluid medium whose velocity is being measured. The deviation is caused by variations in the fraction of the last pulse of the output pulse train included in a predetermined fixed time interval over which the time delays between upstream and downstream pulses are combined to determine velocity. That is, the output from the system shown in U.S. Pat. No. 3,653,259 is proportional to the total time included in a series of ever-widening pulses. This series is terminated abruptly when the end of the "ON" time interval is reached. The number of output pulses included in the ON interval varies as sound speed changes and thereby compensates the output for these changes. The last-pulse effect is a result of the ON time interval ending during an output pulse or during the dead space following the last complete pulse. The effect on the output for a given fluid velocity is to cause it to fluctuate in a sawtooth fashion as sound speed is varied.

SUMMARY OF THE INVENTION

The present invention comprises an improvement in a time difference flowmeter system wherein pulses are transmitted in both directions in a fluid stream, using either two pairs of transducers or a single pair. The received pulses in each path trigger transmit pulses in their respective paths in sing-around fashion. The received pulses from the two transducers are applied to opposite sides of a flip-flop to produce a series of pulses of ever-increasing width during a time interval. By summing the widths of the pulses received during the time interval, a measurement of the rate of fluid flow can be derived.

In accordance with the invention, the last-pulse effect which occurs when an output pulse from the flip-flop does not terminate exactly at the end of a predetermined sing-around ON interval is compensated for by providing successive ON intervals of operation of unequal length. That is, every other ON interval is of a predetermined fixed length while intermediate ON intervals are of a predetermined, shorter length. The output can be considered to consist of two portions, corresponding to the two different ON interval lengths. The difference in lengths between the respective ON periods is chosen to cause variations in the two portions of the output voltage, as sound velocity varies, to tend to cancel.

Figure 2:
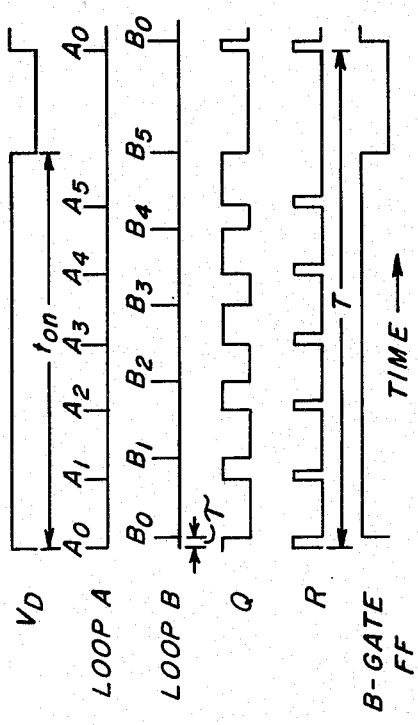

The above and other objects and features of the invention will become apparent from the following detailed description taken in connection with the accompanying drawings which form a part of this specification, and in which:

FIG. 1 is a schematic diagram of a prior art ultrasonic flowmeter system with which the present invention can be used, and included herein for purposes of explanation;

FIG. 2 comprises waveforms illustrating the operation of the system of FIG. 1;

FIGS. 3A and 3B comprise waveforms illustrating the last-pulse effect and the manner in which output voltage can vary as sound velocity varies for a fixed fluid velocity;

FIG. 4 is a schematic circuit diagram, similar to that of FIG. 1, but wherein the means for compensating for last-pulse effect is incorporated; and FIG. 5 comprises waveforms illustrating the operation of the circuit of FIG. 4.

With reference now to the drawings, and particularly to FIG. 1, the system shown includes a fluid conduit K through which a fluid stream flows as indicated by the arrow V. It will be assumed that the fluid stream has a velocity $v$. Disposed within the conduit K are ultrasonic transmitting and receiving transducers 10 and 12, the element 10 comprising an upstream transducer and element 12 comprising a downstream transducer. Ultrasonic pulses transmitted from the upstream transducer 10 to the receiving transducer 12 have a speed equal to $(c + v)$ where $c$ is the sound velocity in the fluid at rest and $v$, as mentioned above, is the velocity of the fluid flowing through the conduit K. The velocity of wave energy passing from the downstream transducer 12 to the upstream transducer 10, however, is $(c - v)$. As a result, if two pulses are transmitted from the transducers 10 and 12 simultaneously, the pulse from the downstream tranducer 12 will arrive at the upstream transducer 10 after that from transducer 10 reaches the downstream transducer 12, the difference in time between the received pulses being proportional to the velocity $v$ of the fluid flowing through the conduit K. Transducers are shown aligned with the flow for simplicity. Generally, in conduits, transducers are disposed in the walls, with the acoustic path at an angle $\theta$ with the conduit axis. For this case, replace $v$ by $v \cos \theta$ in all equations.

The prior art system of FIG. 1 includes two sing-around loops A and B. Loop A includes an amplifier 14, a trigger circuit 16, an astable multivibrator 18 and a pulse generator 20, the output of the pulse generator being applied to the transducer 10. Similarly, the sing-around loop B connected to the output of the transducer 10 includes an amplifier 24, a trigger circuit 26, an astable multivibrator 28 and a pulse generator 30. The pulse generators 20 and 30 can take the form of blocking oscillators or thyristors. The system is controlled by a master multivibrator 32 having a period T illustrated by the waveforms of FIG. 2. At time $t = 0$ in FIG. 2, the master multivibrator 32 enables the astable multivibrator 18 in sing-around loop A, enabling a first transmit pulse in loop A to occur at that instant, this first transmitted pulse being identified as $A_0$ in FIG. 1. As soon as the first pulse is transmitted in sing-around loop A, it is also applied to a delay monostable multivibrator 34 which delays it by the time interval $\tau$ in FIG. 2. The delayed pulse, at the trailing edge of the delay monostable multivibrator output pulse, triggers a flip-monostable multivibrator 36 which now enables the astable multivibrator 28 in sing-around loop B, the first transmit pulse in loop B occurring at the instant multivibrator 28 is enabled. This first pulse in loop B is identified as $B_0$ in FIG. 2. The result, of course, is that the pulses in loop A shown in FIG. 2 lead those in loop B, the first two pulses $A_0$ and $B_0$ being separated by the time difference $\tau$. The delay $\tau$ is introduced to permit sing-around operation in two directions with one pair of transducers. With two pairs of transducers, one pair for each direction of transmission, the delay could be eliminated ($\tau = 0$) although it has other advantages as explained in U.S. Pat. No. 3,653,259. The delayed loop A pulses continue to be applied to the B-gate flip-flop 36; but after the flip-flop 36 changes states in response to the $A_0$ pulse, it is insensitive to further pulses until reset by the master multivibrator 32.

The master multivibrator 32 determines the loop A running time, $t_{ON}$, as well as the overall period T between the start of each series of sing-around repetitions. The two states of the output of master multivibrator 32, a free-running monostable multivibrator, have durations $t_{ON}$ and $(T - t_{ON})$, respectively, both of which are adjustable to establish $t_{ON}$ and T. To increase the average output voltage, $t_{ON}$ should be a large portion of T as shown by waveform $V_D$ of FIG. 2. Accordingly, the dead time $(T - t_{ON})$ is made only as long as necessary to reset the system for the next cycle of repetitions. Reducing dead time $(T - t_{ON})$ is desirable in that it also reduces output ripple and response time.

The master multivibrator 32 gates sing-around loop A ON directly through astable multivibrator 18 for an interval $t_{ON}$ during each period T. B-gate flip-flop 36 gates sing-around loop B ON in a similar manner through astable multivibrator 28 during an interval $(t_{ON} - \tau)$ during each period T, B-gate flip-flop 36 being turned ON by dellay monostable multivibrator 34.

Pulses, coincident with the transmit pulses, from sing-around loop A are applied to one side of an output flip-flop circuit 38; while corresponding pulses from sing-around loop B are applied to the other side of this same output flip-flop 38. The result is that the A-pulses from sing-around loop A turn ON the flip-flop 38; whereas the B-pulses from loop B turn OFF the flip-flop 38, the resulting output waveform of the flip-flop being that shown in FIG. 2 as waveform Q. The output pulses from the flip-flop 38 are then applied to an average voltage sensing circuit 40 which will produce an average output voltage equal to the average voltage of the flip-flop output waveform of FIG. 2. This voltage, however, includes the time delay, $\tau$, which is incorporated into each pulse at the output of flip-flop 38. The output pulses from the monostable multivibrator 34, which are triggered by the A-pulses from astable multivibrator 18, will have the waveform R of FIG. 2. This waveform is applied to an average voltage sensing circuit 42 and its output is substracted from the voltage from circuit 40 in subtractor 44 to derive an output proportional to the velocity of the fluid passing between the transducers 10 and 12.

In the example given in FIGS. 1 and 2, it is assumed that the last B-pulse, $B_5$, occurs exactly at the termination of the period of master multivibrator 32, at which time the flip-flop 36 reverses states. In actual practice, however, and for the reasons hereinafter presented, it may occur that the triggering of flip-flop 36 by master multivibrator 32 may precede the pulse $B_5$, in which case the last pulse in waveform Q will be reduced in width as applied to circuit 40.

The foregoing effect wherein the width of the last pulse in waveform Q is reduced is termed the last-pulse effect and is due to the fact that the velocity of sound between the two transducers 10 and 12 may vary, due primarily to temperature variations. Even with constant sound velocity, the last pulse would be complete and would end precisely when the ON interval ends only for a specific fluid velocity. Only the last portion of the $t_{ON1}$ period is shown in FIG. 3A wherein the pulses $A_5$ and $B_5$ occur. Waveform A in FIG. 3A represents the termination of the period of master multivibrator 32 to produce pulse P5 at the output of flip-flop 38. In actual practice, however, the pulse $B_5$ may not occur at this time due to variations in the speed of sound. As the speed of sound increases, the spacing between A-pulses and the B-pulses will decrease. Thus, as the speed of sound increases and the spacing between the A-pulses and B-pulses decreases, pulse P5 at the output of flip-flop 38 will be displaced further to the left and will be shortened in length as shown by waveforms B, C and D of FIG. 3A. Finally, and assuming that the speed of sound increases further, a point will be reached where, instead of transmitting five pulses in the sing-around loop A, a sixth pulse will be generated, thereby initiating a sixth pulse P6 in the waveform which will progressively increase in length as illustrated by waveforms E, F and G of FIG. 3A. The result of this is that the average voltage sensed by circuit 40 will vary as the sound velocity varies for a given, constant fluid flow rate.

The result in the output voltage from average voltage sensing circuit 40 of FIG. 1 is shown by the sawtooth voltage variation H of FIG. 3A. The line 46 represents the nominal output voltage. Point 48 represents the condition which exists when waveform A is produced and the output voltage is a maximum. As sound velocity increases and the widths of the pulses P5 in waveforms B, C and D decrease, the output decreases until point 50 is reached. This represents the minimum output due to the last-pulse effect. Thereafter, and as illustrated by the waveforms E, F and G, the sixth pulse P6 begins to appear, whereupon the magnitude of the voltage increases until it again reaches a maximum at point 52, which represents the conditions existing when waveform G is produced and the width of pulse P6 is at a maximum. As the sound velocity is further increased, the width of pulse P6 will decrease until point 54 is reached, whereupon the seventh pulse again begins to appear until point 56 is reached where the output is again at a maximum. In actual practice, the waveform H may not be symmetrical as shown in FIG. 3A; however an idealized waveform is shown herein for purposes of explanation.

In accordance with the present invention, the variation in output voltage from the flip-flop 38 is varied by causing alternate $t_{ON}$ times to differ. Thus, as shown in FIG. 3B, the ON time $t_{ON2}$ is shorter than the time $t_{ON1}$ of FIG. 3A, preferably by an amount equal to half the no-flow acoustic travel time between the transducers 10 and 12. Under these circumstances, it will be appreciated that during the second ON time $t_{ON2}$, the pulse P5 is not applied to the average voltage sensing circuit 40. However, as sound velocity increases and the distance between A-pulses and B-pulses decreases, portions of the pulses P5 begin to appear in the output until a maximum amount due to the pulse P5 appears in the output corresponding to the minimum amount for the case of FIG. 3A, waveform D. Then, as sound velocity further increases and the distance between the A-pulses and B-pulses further decreases, the output applied to the voltage sensing circuit 40 will decrease. The result is waveform I shown in FIG. 3B. Note that the trace I is the inverse of the trace H of FIG. 3A. Thus, at point 48 corresponding to the conditions of waveform A, the output due to the last pulse P5 is at a minimum. As sound velocity increases so will the output until point 50 is reached where it is at a maximum, represented by the condition occurring in waveform D. It will then decrease due to a decrease in the width of the pulses P5 until point 54 is reached, at which time a portion of the sixth pulse P6 begins to appear at the output. Although described for the conditions wherein only a few number of pulses appear during the times $t_{ON1}$ and $t_{ON2}$, in an actual installation perhaps 100 pulses will occur in these time periods. Consequently, the last pulse has little effect on the overall output voltage but, nevertheless, will cause it to vary to an extent that may be significant if extreme precision in fluid velocity measurement is required.

It can be seen, therefore, that by varying the ON periods $t_{ON1}$ and $t_{ON2}$ during successive cycles of operation of the ultrasonic flowmeter, the last-pulse effect can be materially reduced. A system for accomplishing this is shown in FIG. 4. Elements in FIG. 4 which correspond to those of FIG. 1 are identified by like reference numerals. In this case, however, the master mulvibrator 32 is not connected directly to the astable multivibrator 18. Rather, it is connected to a flip-flop circuit 60 which divides the output frequency of the master multivibrator by two. The resulting output of the flip-flop 60 is then applied to a monostable multivibrator 62 which will produce an output pulse of predetermined, fixed width during every other output pulse from the master multivibrator 32. The output of the master multivibrator 32 as well as the output of the monostable multivibrator are then applied through an OR circuit 64 to the astable multivibrator 18.

The output of the master multivibrator will appear as waveform A in FIG. 5 and comprises two pulses 66 and 68 both of the same width. Every other one of the pulses 66 and 68, via flip-flop 60, triggers the monostable multivibrator 62 to produce the pulse 70 in waveform B. Thus, pulse 70 in waveform B will be added to every other pulse in waveform A in OR circuit 64. The result is waveform $V_D$ wherein the first ON period $t_{ON1}$ is greater than the second period $t_{ON2}$ by an amount equal to the width of the pulse 70. The result is that every other ON period is lengthened whereby the compensation illustrated in FIGS. 3A and 3B for the last-pulse effect is achieved. This is shown, for example, by curve Q of FIG. 5, which is the output from the flip-flop 38 wherein the sum of the pulse widths during period $t_{ON1}$ is greater than that for period $t_{ON2}$. Again, while only a few pulses are shown during the ON periods, it will be appreciated that in an actual installation, perhaps 100 pulses will be produced during the respective ON periods with the result that the voltage deviation at the output due to the last-pulse effect is relatively small.

It can be shown that, taking into consideration the last-pulse effect, the output from the circuit of FIG. 1, for example, is:

$$E_O = KP\, v_p$$

where $E_O$ is the output voltage, $P$ is a function which accounts for the last-pulse effect, $K$ is a constant, and $v_p$ is the fluid velocity component along the acoustic path. $P$ reaches a high point $P_{NH}$ and a low point $P_{NL}$ for each value of $N$, the number of complete output pulses in the ON interval. The intermediate points fall on approximately straight lines connecting the extremes as shown, for example, in waveforms H and I of FIGS. 3A and 3B. The significant $P$ values are:

$$P_{NH} = 1 + \frac{1-k}{N+k} \quad (2)$$

and $$P_{NL} = 1 - \frac{1-k}{N+1-k} \quad (3)$$

The sound velocity values $c_{NH}$ and $c_{NL}$ where the $P$ reaches a high and low point are:

$$c_{NH} = \frac{d}{t_{ON} - \tau}(N + k/2) \quad (4)$$

and $$c_{NL} = \frac{d}{t_{ON} - \tau}(N + 1 - k/2) \quad (5)$$

where $k$ equals $[2(t_{ON} - \tau) v_p]/d$, $t_{ON}$ equals the duration of the ON interval, $\tau$ equals the delay between the start of the upstream and downstream sing-around loops, and $d$ equals the distance between the transducers. A better understanding of $k$ may be given by noting that it is also equal to $N \Delta t/t_A$ when the conditions of FIG. 2 apply, that is, when a B-pulse coincides with the end of the ON interval. Thus, if $\Delta t$ is small compared to travel times $t_A$ and $t_B$, $k$ is approximately equal to the ratio of the expanded time difference to the maximum possible expanded time difference. Zero fluid velocity corresponds to $k = 0$ and maximum fluid velocity within limits of system operation corresponds to $k = 1$. Allowing for overrange and for $\tau$, full scale fluid velocity may correspond to $k = 0.75$. The calibration constant $K$ in Equation (1) above is:

$$k = \frac{E_1(t_{ON} - \tau)^2}{Td} \quad (6)$$

where $T$ equals the period of the master multivibrator 32 and $E_1$ equals the output voltage level.

As was mentioned above, the difference between the times $t_{ON1}$ and $t_{ON2}$ shown in FIG. 5 should be approximately half the acoustic travel time, determined at a value of sound velocity which best represents the range to be covered (i.e., the average or nominal value). The deviation relative to full scale output can be shown to be proportional to $k(1-k)$ and, hence, is maximum for $k = 0.5$. With the choice of $t_{ON2} - t_{ON1}$ being equal to approximately half the acoustic travel time, nearly perfect compensation is obtained for $k = 0.5$ at the selected value of sound velocity. The compensation for other values of $k$ will be at least 50 percent effective.

The method of the invention is especially useful for large full scale flow velocities since this implies smaller values of $N$ and hence larger deviations. In the event that accuracy requirements and cost would rule out the inclusion of this improvement on certain flowmeter models, it would be useful in calibration to assure that the nominal or mean output was being read. A separate piece of test equipment could introduce a $t_{ON}$ alternation by means of a connection point in the flowmeter under test to cancel deviations at the sound velocity of the fluid in the test facility. While described in terms of a direct current voltage output, the method is applicable when the summation of pulse widths in the output waveform is expressed in other ways, such as a pulse count.

Although the invention has been shown in connection with a certain specific embodiment, it will be readily apparent to those skilled in the art that various changes in form and arrangement of parts may be made to suit requirements without departing from the spirit and scope of the invention. In this respect, it will be apparent that instead of using only two ON time intervals, the number may be increased to, for example, ten different intervals without departing from the scope of the invention.

I claim as my invention:

1. In a flowmeter of the type wherein at least one pair of oppositely disposed ultrasonic transducer means are located in acoustic contact with a fluid stream and in upstream-downstream relation thereto; a first feedback path couples the output of a first of said tranducer means to the input of a second of the transducer means such that upon one acoustic signal being transmitted upstream from the second transducer means to the first transducer means the transmission of another acoustic signal upstream is initiated from said second transducer means when said one upstream acoustic signal is received by said first transducer means, thus generating an upstream train of acoustic signals in sing-around fashion; a second feedback path couples the output of said second transducer means to the input of said first transducer means such that upon one acoustic signal being transmitted downstream from said first transducer means to the second tranducer means the transmission of another acoustic signal downstream is initiated from said first transducer means when said one downstream acoustic signal is received by said transducer means, thus generating a downstream train of acoustic signals in sing-around fashion; the combination of:

gating means for causing said upstream and downstream trains of acoustic signals to occur between said first and second transducer means during respective and successive first and second predetermined time intervals, said first and second predetermined time intervals being different from each other;

means for deriving from the acoustic signals in each of said trains an elementary time interval characteristic of the fluid stream velocity; said elementary time interval increasing by $\Delta t$ increments from one transmitted acoustic signal to the next;

means coupled to said deriving means for generating a first sum signal representing the sum of said elementary time intervals through said first predetermined time interval proportional to:

$\Delta t + 2 \Delta t + 3 \Delta t + \ldots + N \Delta t$ where $\Delta t$ is the elementary time interval for the first acoustic signal in the corresponding train of acoustic signals and $N$ is the number of acoustic signals transmitted and received successively occurring during said first predetermined time interval and for generating a second sum signal representing the sum of said elementary time intervals through said second predetermined time interval proportional to:

$\Delta t + 2 \Delta t + 3 \Delta t + \ldots + N' \Delta t$ where $\Delta t$ is the elementary time interval for the first acoustic signal in the corresponding train of acoustic signals and $N'$ is the number of acoustic signals transmitted and received successively occurring during said second predetermined time interval; and means responsive to said sum representing signal for each of said different predetermined time intervals for deriving first and second sum signals for providing signal combination thereof;

said first and second predetermined time intervals being such that $N=N'$, and the difference between said first and second predetermined time intervals being less than the nominal travel time between said first and second tranducer means for the condition of no fluid flow therebetween, thereby to compensate for deviations in each of said sum signals due to change in the speed of sound.

2. The flowmeter of claim 1 with said gating means including first and second multivibrator means each having enabling and disabling states of operation; wherein operation of said first and second tranducer means is enabled when one of said first and second multivibrator means is in the enabling state, and is disabled when both of said first and second multivibrator means are in the disabling state, said second multivibrator means being set into the enabling state upon alternate returns of said first multivibrator means into the disabling state, said first predetermined time interval being defined by the sum of the enabling periods of said first and second multivibrator means; and said second predetermined time intervals being defined by the enabling period of said first multivibrator means alone, whereby said second multivibrator means determines said differences between said first and second predetermined time intervals.

3. The flowmeter of claim 1 wherein said gating means establishes said first and second predetermined time intervals with a difference substantially equal to half of said nominal travel time.

* * * * *